Patented Nov. 26, 1940

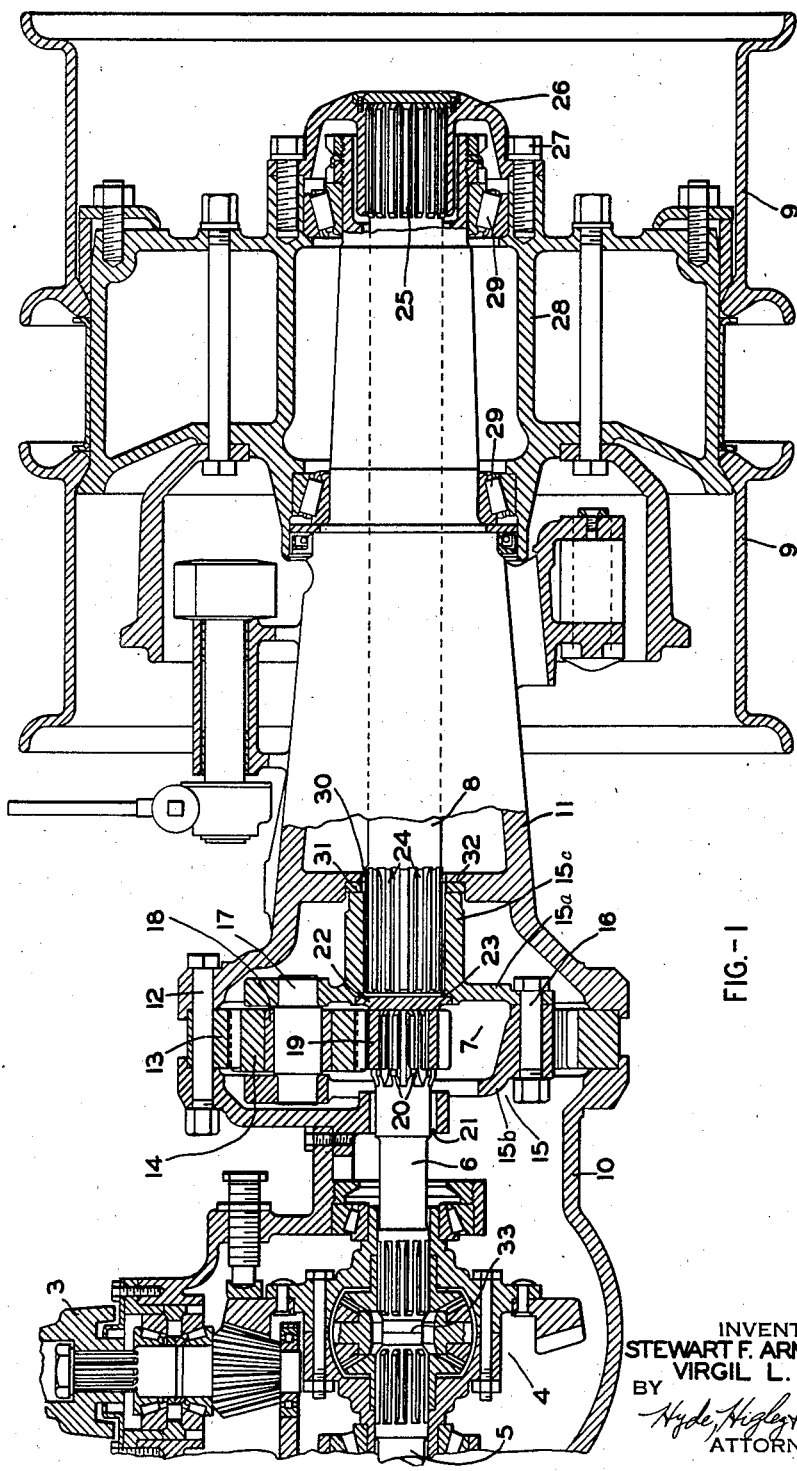

2,222,697

UNITED STATES PATENT OFFICE 2,222,697

ROAD VEHICLE DRIVING AXLE

Stewart F. Armington, Willoughby, and Virgil L. Snow, Euclid, Ohio, assignors to The Euclid Road Machinery Company, Euclid, Ohio, a corporation of Ohio Application June 24, 1939, Serial No. 280,944

3 Claims. (Cl. 74—314)

This invention relates to driving axles, and more particularly to a driving axle for a pair of wheels wherein differential means are employed to distribute the drive between wheels and reducing gearing is arranged to be effective between the differential means and each wheel, or in other words, a double reduction drive.

An object of the present invention is to prevent the transmission of end thrust from the drive, located centrally of the axle, outwardly to that portion of the axle which drives the wheels.

Another object of the present invention is to transmit any end thrust from a centrally located drive outwardly to points on a rigid housing so that all such thrust is absorbed by the housing.

The invention also provides a novel driving axle structure which materially reduces the number of thrust bearings and thrust washers necessary.

The exact nature of this invention together with further objects and advantages thereof will be apparent from the following description taken in connection with the accompanying drawing in which the single figure is a partial sectional view in the central horizontal plane of the axle.

Referring to the drawing, a drive shaft 3 adapted for driven connection with the power means acting through differential mechanism indicated generally at 4 drives shafts 5 and 6 which are connected with the center pinions of the planetary assemblies at opposite sides of the vehicle, both of which are alike but only that driven by shaft 6 being shown. The planetary speed reduction gearing is shown generally at 7 and drives a shaft 8 which in turn has driven connection with the wheel or wheels 9, of which there are generally two on each side of the vehicle. The differential and the shafts 5 and 6 are encased in a housing portion 10 while the wheels are supported for rotation by a housing portion 11 which also encases the shaft 8. These portions of the housings are rigidly secured together as by suitable bolts 12.

Referring now to the planetary speed reducing gearing 7, the ring gear 13 thereof is held in fixed position between the housings 10 and 11 by means of the bolts 12. The planet pinions 14, of which three are indicated, spaced as usual 120° apart, are rotatably mounted in a spider 15. The spider is formed in two parts 15a and 15b secured together by bolts 16 spaced between the planet pinions. Each pinion is mounted on a short shaft 17 supplied with a bushing 18.

The center pinion 19 of the planetary gearing is supported in a full floating manner so that it is free to move radially in any direction. The driving connection between shaft 6 and pinion 19 comprises a plurality of splines 20 with which coacting grooves of the pinion have a pressed fit. The pinion fits snugly against shoulders at the inner ends of the splines. The shaft 6 at its end which carries the pinion 19 is not closely supported in a bearing but instead there is a slight play at the point 21 which permits the pinion 19 to center itself between the planet pinions 14 when driving, thus giving equal planetary tooth loads. However, when the vehicle is coasting freely the shaft 6 due to its own weight would tend to drop down at the planetary end, causing a misalinement of the differential parts into which the inner end of the shaft is splined. The clearance at point 21 is of the nature of $\frac{1}{32}$ inch which is impossible to indicate on the drawing; but has a very substantial effect in actual operation of a heavy truck or the like.

For the purpose of preventing the transmission of end thrust from the wheel end of shaft 8 to the planetary gearing the splined connection between shaft 8 and spider 15 ends short of contact with the shaft 6 or the thrust washer 22 in contact with shaft 6 leaving a space as shown at 23 permitting end play of the shaft 8 without transmitting any end thrust. The spider portion 15a of the planetary gearing has a driving connection with shaft 8 permitting relative longitudinal movement between them axially of shaft 8. The connection disclosed comprises a plurality of splines 24 on the shaft 8 entering keyways in the spider. The outer end of shaft 8 has a spline connection 25 with a cap member 26 which in turn is secured by bolts 27 to the rim carrying member 28. This member supports the tire equipment and in its turn is rotatably mounted on the housing member 11 by means of the bearings 29. A radial clearance is indicated at the point 30 between shaft 8 and the surrounding thrust collar 31 and also between the shaft and housing portion 11. This permits the spider composed of the members 15a and 15b to float radially in the ring gear 13.

When the vehicle is being driven, thrust is developed along shafts 5 and 6. We have devised a novel structure for transmitting this thrust to the housing 10, 11. The spider portion 15a has a hub 15c carrying the grooves or keyways which coact with the splines 24 on shaft 8. The thrust washer 22 has its central portion bearing against the end of shaft 6 and its rim bearing against a suitable shoulder in one end of hub 15c. The opposite end of the hub bears against a shoulder 32 on housing 11. Preferably the thrust washer 31 is supplied at this point. Any thrust endwise of shaft 6 is transmitted through washer 22, hub 15c and washer 31 to housing portion 11. It will be understood that the axle is symmetrical about the point 33 and outward thrust along shaft 5 is transmitted to housing portion 11 on the opposite side through parts like 22, 15c and 31 just described.

Since housing 10, 11 is rigid across the central portion of the axle and the shafts 5 and 6 abut at their inner ends, all thrust from the driving differential is absorbed between the points 32 on opposite sides of the center.

With the above described construction, no driving thrust is transmitted to the shafts 8 and the number of thrust washers and bearings on the axle assembly is greatly reduced.

What we claim is:

1. A driving axle comprising drive means located centrally thereof, two abutting driving shafts, one on each side of said drive means and in driving relation therewith, two driven shafts one on each side axially alined respectively with said first named shafts and having endwise clearance between them, a planetary speed reduction gearing between each of said driving shafts and its associated driven shaft, each reduction gearing having a center pinion on its associated driving shaft and a spider carrying the planet pinions and a ring gear, said spider having a splined connection with its associated driven shaft permitting relative axial movement between them, a rigid housing for said shafts, and means for transmitting outward thrust of said driving shafts to said housing.

2. A driving axle as in claim 1 wherein each of said spiders has a hollow hub carrying a portion of said splined connection, and said last named means comprises means at one end of each spider hub for transmitting thrust from the associated driving shaft to the hub and an abutment on said housing engaging the other end of the hub to receive the thrust.

3. Vehicle propelling means comprising a driving axle having a centrally located differential drive, bearings one on each side of said drive and receiving the radial and axial bearing load of said differential drive, two alined driving shafts, each shaft extending laterally beyond one of said bearings and in driving relation with said differential drive, two driven shafts, one on each side axially alined respectively with said first named shafts and having endwise clearance between them, a planetary speed reduction gearing between each of said driving shafts and its associated driven shaft, each reduction gearing having a center pinion on its associated driving shaft and a spider carrying the planet pinions and a ring gear, said spider having a driving connection with its associated driven shaft, a housing for said shafts, each center pinion being mounted on its associated driving shaft laterally beyond said first named bearing, each driving shaft at that point having radial clearance, and means for transmitting axial thrust only from each driving shaft to said housing, whereby each center pinion floats between its associated planet pinions.

STEWART F. ARMINGTON.
VIRGIL L. SNOW.